United States Patent Office 2,875,250
Patented Feb. 24, 1959

2,875,250

ETHER PRODUCTS

Samuel Allen Heininger and Gail H. Birum, Dayton, Ohio, assignors to Monsanto Chemical Company, St. Louis, Mo., a corporation of Delaware No Drawing. Application February 21, 1957
Serial No. 641,494

9 Claims. (Cl. 260—609)

This invention relates to ether products and more particularly to products of the reaction of vinyl ethers with halogenated aromatic sulfenyl halides.

So far as we are aware, it has not been known previously to add sulfenyl halides to vinyl ethers. It has now been found that this reaction proceeds readily, but differs from previously known reactions of sulfenyl halides with unsaturated compounds in that the product isolated from this reaction is olefinic.

The presently useful vinyl ethers are of the formula $CH_2=CHOR$, where R represents a hydrocarbon radical free of aliphatic unsaturation and containing from 1 to 6 carbon atoms. By aliphatic unsaturation is herein meant acetylenic or olefinic carbon-to-carbon unsaturation. Exemplary of presently useful vinyl ethers are, e. g., alkyl ethers such as vinyl methyl ether, vinyl ethyl ether, vinyl propyl ether, vinyl isobutyl ether, vinyl amyl ether, and vinyl hexyl ether; and cyclic vinyl ethers, e. g., 2-methylcyclopentyl vinyl ether, cyclohexyl vinyl ether, and vinyl phenyl ether.

The halogenated aromatic sulfenyl halides reactive with vinyl ethers in accordance with this invention are preferably halobenzenesulfenyl halides. The halogen present in the halobenzenesulfenyl halides is preferably chlorine or bromine. Thus, the presently preferred class of sulfenyl halides for use in accordance with this invention are benzenesulfenyl bromides and chlorides wherein the benzene ring is substituted by from 1 to 5 chlorine and/or bromine atoms. Exemplary of presently useful halobenzenesulfenyl halides are p-chlorobenzenesulfenyl chloride, p-bromobenzenesulfenyl chloride, 2,4-dichlorobenzenesulfenyl chloride, 3,4-dichlorobenzenesulfenyl chloride, 2,5-dichlorobenzenesulfenyl chloride, 2,4,5-trichlorobenzenesulfenyl chloride, 2-bromo-3,4-dichlorobenzenesulfenyl chloride, 2,3,5,6-tetrachlorobenzenesulfenyl chloride, pentachlorobenzenesulfenyl chloride, etc.

In accordance with this invention, a vinyl ether as defined above is reacted with one of the presently useful sulfenyl halides to form a reaction product comprising compounds containing sulfur and oxygen atoms. The initial reaction of a sulfenyl halide with a vinyl ether in accordance with this invention appears to be formation of an intermediate wherein the halophenylthio radical of the sulfenyl halide has added to the double bond of the vinyl ether. It has been found that this intermediate spontaneously changes into a compound containing olefinic unsaturation and wherein sulfur and oxygen atoms are present. The presently afforded olefinic reaction products may be represented by the alternative formulas

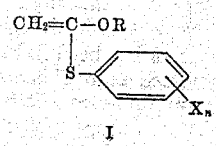

I and

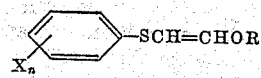

II where R is as defined hereinabove, X represents chlorine or bromine, and n is an integer of from 1 to 5. It should, of course, be understood that product labelled II directly above can occur in the mixture in both of the possible geometrical isomer forms, i. e. the cis or the trans. The position of attachment of the halophenylthio radical in these products is uncertain and may be either attached to the carbon atom bonded to the oxygen atom to form a compound as represented by Formula I, or bonded to the olefinic carbon atom beta to the oxygen atom to form a bi-laterally-substituted olefin as represented by Formula II. Quite possibly a mixture of the two isomeric forms is obtained. Accordingly, we prefer to represent our presently afforded olefinic compounds by the general formula

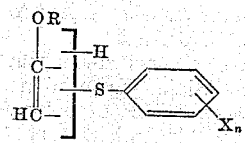

where R, X and n are as defined hereinabove.

The olefinic products of this invention may be characterized as 1(2)-(halophenylthio)vinyl ethers, where by this nomenclature is meant a 1-(halophenylthio)vinyl ether and/or a 2-(halophenylthio)vinyl ether.

Exemplary of the olefinic compounds obtainable in accordance with this invention are 1(2)-(4-chlorophenylthio)vinyl methyl ether, 1(2)-(4-chlorophenylthio)vinyl ethyl ether, 1(2)-(2-chlorophenylthio)vinyl ethyl ether, 1(2)-(4-bromophenylthio)vinyl ethyl ether, 1(2)-(4-chlorophenylthio)vinyl propyl ether, 1(2)-(4-chlorophenylthio)vinyl n-butyl ether, 1(2)-(4-chlorophenylthio)-vinyl isoamyl ether, 1(2)-(4-chlorophenylthio)vinyl cyclohexyl ether, 1(2)-(4-chlorophenylthio)vinyl phenyl ether, 1(2)-(2,4-dichlorophenylthio)vinyl ethyl ether, 1(2)-(3,4-dichlorophenylthio)vinyl methyl ether, 1(2)-(3,5-dichlorophenylthio)vinyl ethyl ether, 1(2)-(2,4,5-trichlorophenylthio)vinyl ethyl ether, 1(2)-(2-bromo-4-chlorophenylthio)vinyl isobutyl ether, 1(2)-(pentachlorophenylthio)vinyl ethyl ether, 1(2)-(pentachlorophenylthio) vinyl phenyl ether, etc.

The new ether products are prepared by reacting a halobenzenesulfenyl halide as defined above with one of the presently useful vinyl ethers to form an unsaturated compound containing sulfur and oxygen atoms and of the formula

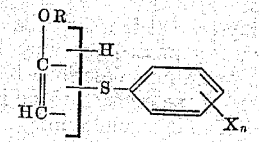

where R, X and n are as defined hereinabove. The process of the invention appears to involve the reaction of equimolecular amounts of sulfenyl halide and vinyl ether, but if desired, an excess of the more readily available component may be present in the reaction mixture to serve, e. g., as a reaction diluent. In accordance with the present process, the two reaction components are contacted for a time and temperature such as to produce unsaturated compounds. The rapidity of reaction varies greatly, depending on the reactants chosen and may be sufficiently exothermic to require cooling and/or diluents to moderate the violence of the reaction, or may not reach completion until after a period of refluxing at elevated temperatures. Suitable inert solvents or diluents which may be employed in the reaction mixture, if desired, include hydrocarbons such as benzene or hexane, halogenated solvents such as chloroform or ethylene dibromide, oxygenated solvents free of active hydrogen, e. g., ether or dioxane, etc. The particularly preferred class of solvents are anhydrous organic carboxylic acids and especially glacial acetic acid, since this solvent also has the advantage of acting as a catalyst for the reaction. Mixtures of glacial acetic acid and an inert solvent such as ethylene dichloride may also be used as a reaction medium, if desired.

To accelerate the rate of reaction when desired, heating and catalysts are employed. Suitable temperatures for carrying out the reaction comprise, e. g., any temperature from room temperature up to temperatures below the decomposition temperature of the reaction mixture constituents. Acid catalysts are useful in accelerating the initial reaction of the presently useful sulfenyl halides and vinyl ethers; in addition to the organic carboxylic acid catalysts mentioned above, there may alternatively be used Friedel-Crafts catalysts such as aluminum trichloride, or boron trifluoride complexes. Pressure variation may also be utilized to facilitate conducting the reaction, if desired.

Since the present vinyl ethers may be susceptible to thermal polymerizaiton, the reaction may, if desired, be conducted in the presence of polymerization inhibitors. Examples of suitable inhibitors are hydroquinone, the monomethyl ether of hydroquinone, selenium dioxide, p-t-butylcatechol, methylene blue, etc.

The time required to accomplish the reaction depends on functional factors such as the reactivity of the vinyl ether and the sulfenyl halide, the temperature of the reaction, the presence or absence of catalysts, etc. The initial reaction wherein the halophenylthio radical adds to the vinyl ether may conveniently be followed by observing the change in color of the reaction mixture. Sulfenyl halides are generally a deep red shade; as the reaction with the vinyl ether proceeds, the color of the reaction mixture generally brightens gradually, usually becoming a clear yellow or orange shade by the time all of the sulfenyl halide has reacted. Subsequently to the initial addition of the halophenylthio radical to the vinyl ether, formation of the olefinic products of the invention occurs. This formation of olefinic products may be promoted, if desired, by heating and/or the addition of hydrogen halide acceptors, e. g., pyridine, but in many cases, the use of such accelerating agents is not required and the reaction to form the olefinic product occurs spontaneously at room temperature. Reaction rates and times of reaction may vary, also, depending on details of apparatus and other operational conditions.

On completion of the reaction, the olefinic product may be isolated by usual procedures such as distillation, extraction, etc.

It will be appreciated that by modification of the apparatus, continuous procedures may be substituted for the batch-type operations described below.

As exemplary of the process of the invention there are described the following non-limiting examples:

*Example 1*

To 14.4 g. (0.2 mole) of vinyl ethyl ether in 100 ml. of glacial acetic acid were added 35.8 g. (0.2 mole) of p-chlorobenzenesulfenyl chloride. There was an immediate exothermic reaction, raising the reaction mixture temperature to 75° and changing the color of the reaction mixture to light yellow within about 2 minutes. After standing for about one hour, the reaction mixture had turned dark; on distillation, there were collected 21 g. of 2(1)-(4-chlorophenylthio)vinyl ethyl ether, as a yellow liquid, $n_D^{25}$ 1.5877, B. 126–131°/0.4–0.5 mm. The product was identified as an olefin by infrared analysis and the identification was confirmed by the following elementary analysis:

|  | Found | Calcd. for $C_{10}H_{11}ClOS$ |
| --- | --- | --- |
| Percent: |  |  |
| C | 53.12 | 55.9 |
| H | 4.96 | 5.16 |
| Cl | 17.29 | 16.5 |
| S | 14.82 | 14.9 |

*Example 2*

To 26.3 g. (1.47 moles) of redistilled p-chlorobenzenesulfenyl chloride in 100 ml. of glacial acetic acid was added 20 g. (0.2 moles) of vinyl n-butyl ether. An immediate exothermic reaction occurred—giving a color change from the red of the sulfenyl chloride to a bright yellow. However, on standing for one-half hour, the color changed to a very dark orange-red. The solvent was distilled off at 0.5 mm. pressure leaving a dark oil, 42.7 g. or slightly more than theory for the adduct. A sample of crude dark oil remaining in the flask was submitted for elemental analysis with the following results:

|  | Found | Calcd. for $C_{12}H_{15}ClOS$ |
| --- | --- | --- |
| Percent: |  |  |
| C | 53.0 | 59.3 |
| H | 6.0 | 6.2 |
| Cl | 14.3 | 14.6 |
| S | 10.4 | 13.2 |

The presently provided compounds are generally mobile liquids, soluble in a variety of organic solvents such as ethanol, ether, benzene and acetone and substantially insoluble in water. They are useful for a variety of chemical and agricultural purposes. Thus, for example, the olefinic compounds of the invention may be utilized as intermediates for chemical synthesis, e. g., they may be polymerized by free radical catalysts such as benzoyl peroxide to form polymeric materials useful for the preparation of films, molded articles, etc. The compounds of the invention are also adapted for use as biological toxicants, e. g., as herbicides, insecticides, agricultural fungicides, nematocides, etc.; they are particularly useful as microbiological toxicants. This utility is illustrated by incorporating one of the present products in a growth medium for bacteria and fungi at a concentration, e. g., of 0.1%, whereby the medium is rendered incapable of supporting the growth of bacterial and fungal organisms such as *Micrococcus pyogenes* var. *aureus*, *Salmonella typhosa*, *Aspergillus niger*, etc.

For use as a pesticide, the present compounds may be employed as constituents of organic solutions, aqueous dispersions, or emulsions or dusting formulations, prepared by mixing the toxic compounds with an inert finely-divided powder. They may be employed as disinfecting and preserving agents in the textile industry for preserving fabrics or for disinfecting bandage material, instruments, for skin, surfaces such as floors and walls and the like, and also for disinfecting and preserving cosmetics and nutrient substances.

The (haloarylthio)vinyl ethers of the invention can be oxidized (e. g., with hydrogen peroxide in acetic acid, potassium permanganate chromic acid, etc.) to provide the corresponding sulfoxide and sulfone derivatives, which also will be useful as biological toxicants.

While the invention has been illustrated with reference to particular preferred embodiments thereof, it will be appreciated that variations can be made without departing from the spirit and scope of the invention.

What is claimed is:

1. The method which comprises contacting a sulfenyl halide selected from the class consisting of benzenesulfenyl bromides and chlorides, wherein the benzene ring of said benzene-sulfenyl bromides and chlorides is substituted by from 1 to 5 halogen atoms selected from the class consisting of chlorine and bromine atoms, with a vinyl ether of the formula $CH_2=CHOR$, where R is an alkyl radical having from 1 to 6 carbon atoms and thereby forming a reaction product comprising compounds of the formula

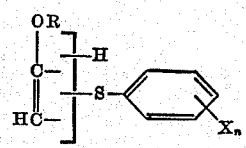

where R is as defined hereinabove, X represents a halogen selected from the class consisting of chlorine and bromine, and $n$ is an integer of from 1 to 5.

2. The method of claim 1, wherein the reaction of said sulfenyl halides with said vinyl ethers is carried out in the presence of glacial acetic acid.

3. The method which comprises contacting a benzenesulfenyl chloride wherein the benzene ring of said sulfenyl chloride is substituted by from 1 to 5 chlorine atoms, with a vinyl ether of the formula $CH_2=CHOR$, where R represents a lower alkyl radical of from 1 to 6 carbon atoms, and thereby forming an olefinic compound of the formula

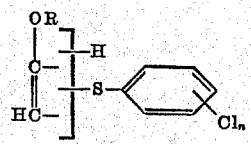

where R is as defined hereinabove, and $n$ is an integer of from 1 to 5.

4. The method which comprises contacting p-chlorobenzenesulfenyl chloride with vinyl ethyl ether and thereby forming a 2(1)-4-(chlorophenylthio)vinyl ethyl ether.

5. The method of claim 4, where said reaction is carried out in the presence of glacial acetic acid.

6. 2(1)-4-(chlorophenylthio)vinyl ethyl ether of the formula

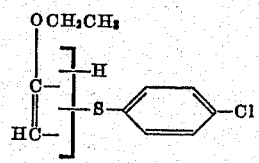

7. 2(1)-4-(chlorophenylthio)vinyl n-butyl ether of the formula

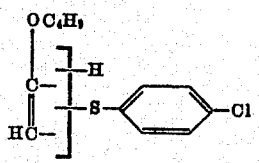

8. A (chlorophenylthio)vinyl alkyl ether of the formula

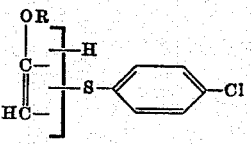

where R represents an alkyl radical of from 1 to 6 carbon atoms.

9. A halophenylthio-substituted vinyl ether of the formula

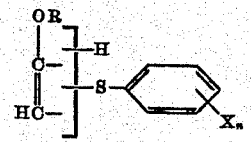

where R is an alkyl radical having from 1 to 6 carbon atoms, X represents a halogen selected from the class consisting of chlorine and bromine and $n$ is an integer of from 1 to 5.

No references cited.